(12) United States Patent
Srinivasan et al.

(10) Patent No.: US 11,108,632 B1
(45) Date of Patent: Aug. 31, 2021

(54) PRESCRIPTIVE ANALYTICS BASED DATA WAREHOUSE CLUSTER NODE OPTIMIZATION STACK FOR CLOUD COMPUTING

(71) Applicant: Accenture Global Solutions Limited, Dublin (IE)

(72) Inventors: Madhan Kumar Srinivasan, Bangalore (IN); Kishore Kumar Gajula, Telangana (IN); Samba Sivachari Rage, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 16/818,333

(22) Filed: Mar. 13, 2020

(51) Int. Cl.
*H04L 12/24* (2006.01)
*G06N 3/04* (2006.01)

(52) U.S. Cl.
CPC ........... *H04L 41/0823* (2013.01); *G06N 3/04* (2013.01); *H04L 41/16* (2013.01)

(58) Field of Classification Search
CPC ............................ H04L 41/0823; H04L 41/16
See application file for complete search history.

(56) References Cited

U.S. PATENT DOCUMENTS 10,120,714 B1 * 11/2018 Cabrera ................. G06F 9/505
10,887,172 B2 * 1/2021 Di-Cairano-Gilfedder ................. H04L 41/0896

* cited by examiner

*Primary Examiner* — Adnan M Mirza (57) ABSTRACT

A mufti-layer duster node optimization (CNO) stack may generate a token containing cluster node optimization prescriptions for detaching nodes from a storage cluster. A prescriptive engine layer of the ONO stack may select target computing resource nodes from a selected cluster based on the utilization tracking data, the optimization metric thresholds, and the ONO interval; utilize a prediction engine to predict respective storage utilizations over a next operation cycle for the nodes of the selected cluster; generate an aggregated storage utilization prediction for the selected cluster based on the predicted storage utilizations; determine a network traffic coefficient for the selected cluster based on the network traffic data; perform a cluster determination whether to execute a cluster node optimization for the selected cluster based on the aggregated storage utilization prediction and the network traffic coefficient; and generate a CNO token based on the cluster determination.

20 Claims, 7 Drawing Sheets

PRESCRIPTIVE ANALYTICS BASED DATA WAREHOUSE CLUSTER NODE OPTIMIZATION STACK FOR CLOUD COMPUTING

TECHNICAL FIELD

This disclosure relates to storage cluster node optimization via a prescriptive analytics based data warehouse cluster node optimization stack.

BACKGROUND

Rapid advances in communications and storage technologies, driven by immense customer demand, have resulted in widespread adoption of cloud systems for managing large data payloads, distributed computing, and record systems. As one example, modern enterprise systems, for example those relying on object storage architectures, presently maintain data records many petabytes in size in the cloud. Improvements in tools for cloud resource allocation, utilization, and consumption prediction will further enhance the capabilities of cloud computing systems.

BRIEF DESCRIPTION OF THE DRAWINGS

The present disclosure may be better understood with reference to the following drawings and description. The components in the figures are not necessarily to scale. Moreover, in the figures, like-referenced numerals designate corresponding parts throughout the different views.

DETAILED DESCRIPTION

Maintenance efficiency for the business information technology (IT) landscape is getting more complex, A comprehensive representation of software and infrastructure costs for both on-premises and cloud environments is required. One may need to manage large enterprise purchases of software, hardware and annual or monthly subscriptions for Software as a Service (SaaS), as well as per-minute on-demand spend for public cloud like Amazon® Web Services (AWS). This complexity leads to inefficiency in IT spend.

With the passage of time, changes in the work loads and the requirements for provisioned cloud infrastructure are likely. Thus, it is desirable to dynamically optimize the acquired cloud computing resources to reflect the actual resource requirements. For example, redundant cloud computing resources may be removed or rightsized.

On the other hand, the cloud computing performance should not be compromised by the downsizing/rightsizing of cloud computing resources. Take cloud database services such as Amazon Redshift® data warehouse as example, the data warehouse requires buffer memory on cluster to create temporary tables during query execution. When sufficient memory is not available, the query performance may be compromised. Besides the performance being adversely effected, vacuuming operations also require memory during the rebalancing operation. Therefore, one of the objectives of the present disclosure is to optimize the cloud computing resources without sacrificing the cloud computing performance.

A data warehouse may be a collection of computing resources called nodes or computing resource nodes, which are organized into groups called clusters or computing resource clusters. Each computing resource cluster may run a processing engine and contains one or more databases. Take Amazon Redshift® as an example, Redshift's cluster and node organization represents a Massively Parallel, with network interface circuitry, Processing (MPP) architecture. MPP is a technology that allows multiple processors to perform concurrent operations. A cluster is the core processing unit in the Redshift data warehouse. Each Redshift cluster may be composed of two main components: compute computing resource node and leader computing resource node.

The compute computing resource nodes may have its own dedicated Central Processing Unit (CPU), memory, and disk storage. The compute computing resource node stores data and execute queries. Each cluster may have multiple compute computing resource nodes. The compute computing resource nodes may be classified to two types: dense compute computing resource node and dense storage computing resource node. The dense compute computing resource nodes are best for high performance, but have less storage. The dense storage computing resource nodes are best used for clusters with high volume data.

By way of examples, various metrics for the two node types are provided in table 1.

TABLE 1

Example metrics for dense compute computing
resource node and dense storage computing resource node

|  | vCPU | ECU | Memory | Storage | I/O | Price |
|---|---|---|---|---|---|---|
| Dense Compute | | | | | | |
| dc2.large | 2 | 7 | 15 GiB | 0.16 TB SSD | 0.6 GB/sec | $0.25 per Hour |
| dc2.8xlarge | 32 | 99 | 244 GiB | 2.56 TB SSD | 7.5 GB/sec | $4.80 per Hour |
| Dense Storage | | | | | | |
| ds2.xlarge | 4 | 14 | 31 GiB | 2 TB HDD | 0.4 GB/sec | $0.85 per Hour |
| ds2.8xlarge | 36 | 116 | 244 GiB | 16 TB HDD | 3.3 GB/sec | $6.80 per Hour |

The leader computing resource node manages communication between the compute computing resource nodes and the client applications. The leader computing resource node compiles and distributes code across multiple compute computing resource nodes. It also assigns a portion of the data to each compute computing resource node for processing.

Herein, embodiments of the present disclosure will be described in the context of cloud data warehouse, it should be appreciated, however, that the techniques described below can be utilized for other applicable storage architectures or techniques.

The cluster node optimization (CNO) stack techniques and architectures described below may be used to accurately prescribe recommendations for data warehouse cluster node optimization based on analysis of data associated with the cluster nodes. The cluster node optimization may include, for example, rightsizing/downsizing the number of nodes in the cluster. Further, the analysis may include utilization tracking data and network traffic data of the cluster nodes. The utilization tracking data may include, for example, the tracking data of the present and historical storage utilization as well as the present and historical CPU Utilization. The network traffic data may, for example, include network receive throughput and network transmit throughput.

The analysis may also include storage access data, performance data, consumption metrics data, or other metadata. Thus, a CNO stack may provide prescriptive recommendations for cluster node optimization taking into account resource utilization patterns, network traffic throughput, data connections, database write/read performance, and/or other data. Thus, the disclosed CNO stack techniques and architectures improve the operation efficiency of the underlying hardware by optimizing the data warehouse cluster nodes.

Figure 1:
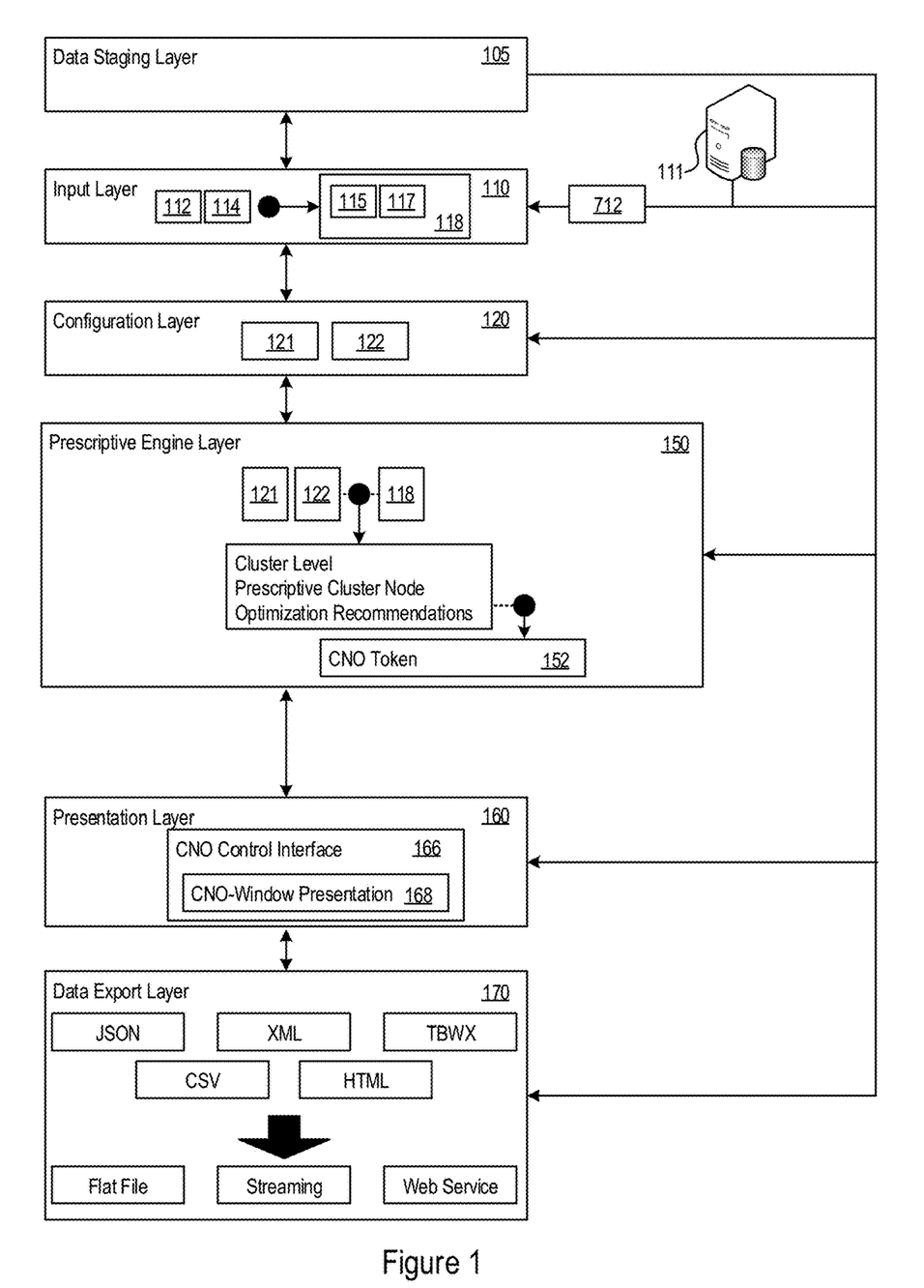
FIG. 1 shows an example multiple-layer cluster node optimization stack.

FIG. 1 shows an example multiple layer CNO stack 100. In this example, the CNO stack 100 includes a data staging layer 105, an input layer 110, a configuration layer 120, a prescriptive engine layer 150, a presentation layer 160, and a data export layer 170. The CNO stack 100 may include a multiple-layer computing structure of hardware and software that may provide prescriptive analytical recommendations (e.g., duster node optimization prescriptions) through data analysis.

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate data processing. As one example, for the CNO stack 100, the data staging layer 105 may provide the input layer 110 with storage resources to store ingested data within a database or other data structure. In some implementations, the data staging layer 105 may be deployed as a cloud-based database platform with the capability to process mass data. In an example, an underlying Big Data Lake of the database platform is capable of ingesting data from heterogeneous data sources such as Amazon Simple Storage Service (S3), Secured Storage, Hadoop file systems (HDFS) connections, relation databases, flat files, and other data operations. Hence, the data staging layer 105 may provide a hardware resource, e.g., memory storage resources, to the input layer 110. Accordingly, the multiple-layer stack architecture of the CNO stack 100 may improve the functioning of the underlying hardware.

Figure 2:
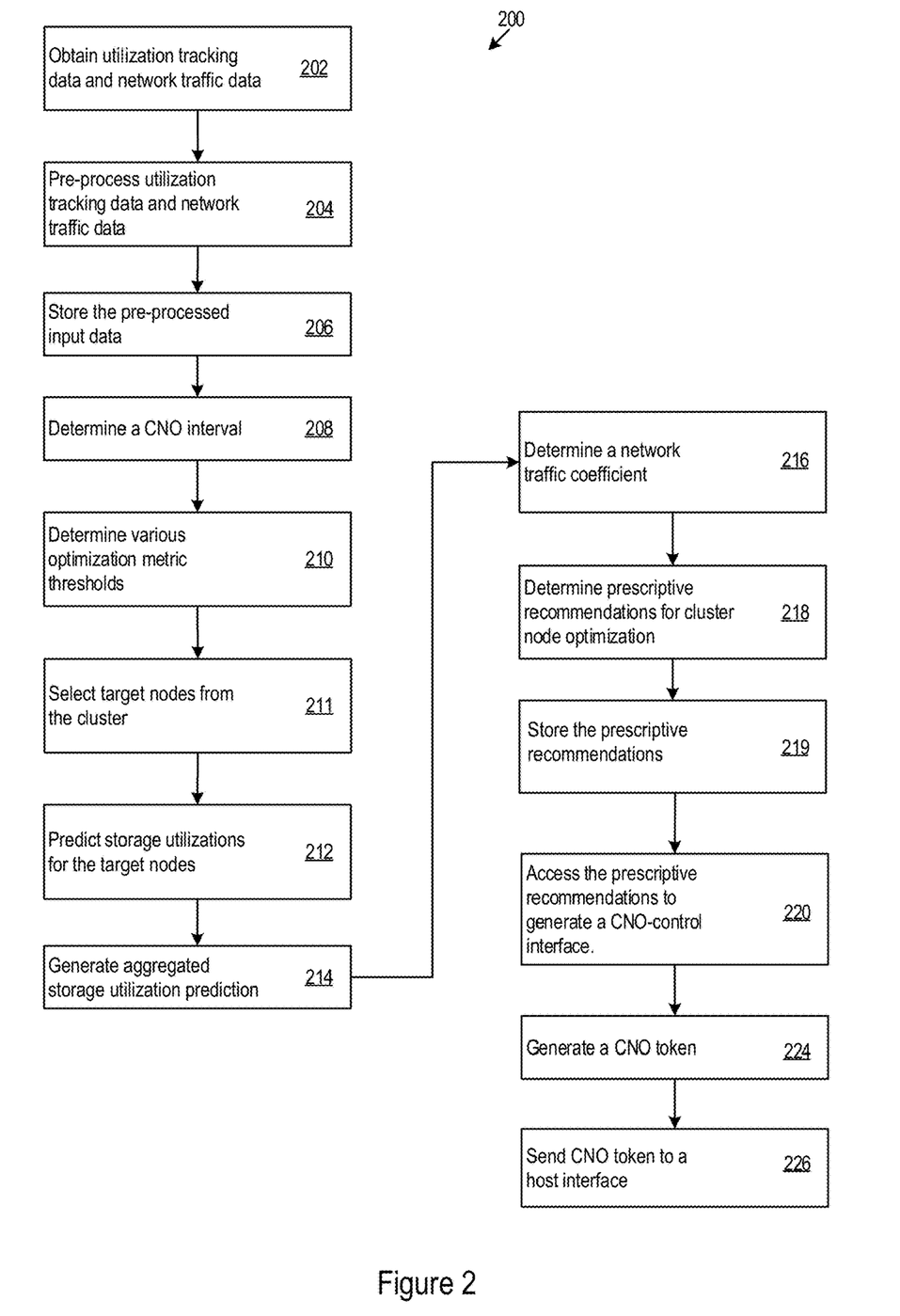
FIG. 2 shows example cluster node optimization logic.

In the following, reference is made to FIG. 1 and the corresponding example CNO logic (COL) 200 in FIG. 2. The logical features of COL 200 may be implemented in various orders and combinations. For example, in a first implementation, one or more features may be omitted or reordered with respect to a second implementation. At the input layer 110 of the CNO stack 100, the COL 200 may obtain utilization tracking data 112 and network traffic data 114 as the input data (202). In some cases, the utilization tracking data 112 and network traffic data 114 may be received via communication interfaces (e.g., communication interfaces 712, discussed below). The utilization tracking data 112 and network traffic data 114 may be accessed at least in part, e.g., via the communication interfaces 712, from data sources 111, which may include, storage utilization files, network traffic data, storage expenditure files, or other data sources.

Optionally, at the input layer 110, the COL 200 may pre-process the input data, i.e., the utilization tracking data 112 and network traffic data 114 (204). In some implementations, the pre-processing may include data transformations on the input data such as z transformation or log transformation and treatment of outlier data, anomaly data, and missing value data in the input data.

The COL 200 then may, at the input layer 110, store the pre-processed input data 118, including the pre-processed utilization tracking data 115 and the pre-processed network traffic data 117, via a memory operation at the data staging layer 105 (206). In some implementations, the pre-processed input data 118 may be indexed to speed up query processing.

At the configuration layer 120, the COL 200 may determine a CNO interval 121 to optimize cluster nodes of the cloud data warehouse (208). For example, the CNO interval 121 may be predetermined to be periodical or non-periodical (e.g., hourly, month-date, monthly, quarterly). For another example, the CNO interval 121 may be selected by the system operator.

In order to optimize the cluster nodes of the cloud data warehouse, the COL 200 may, at the configuration layer 120, further determine various optimization metric thresholds 122 for the clusters (210). The optimization metric thresholds may include, for example, minimum CPU utilization, maximum CPU utilization, storage percentile utilization, and network coefficients. For example, the COL 200 may determine the optimization metric thresholds 122 for a selected cluster through the selection of the system operator.

Figure 3:
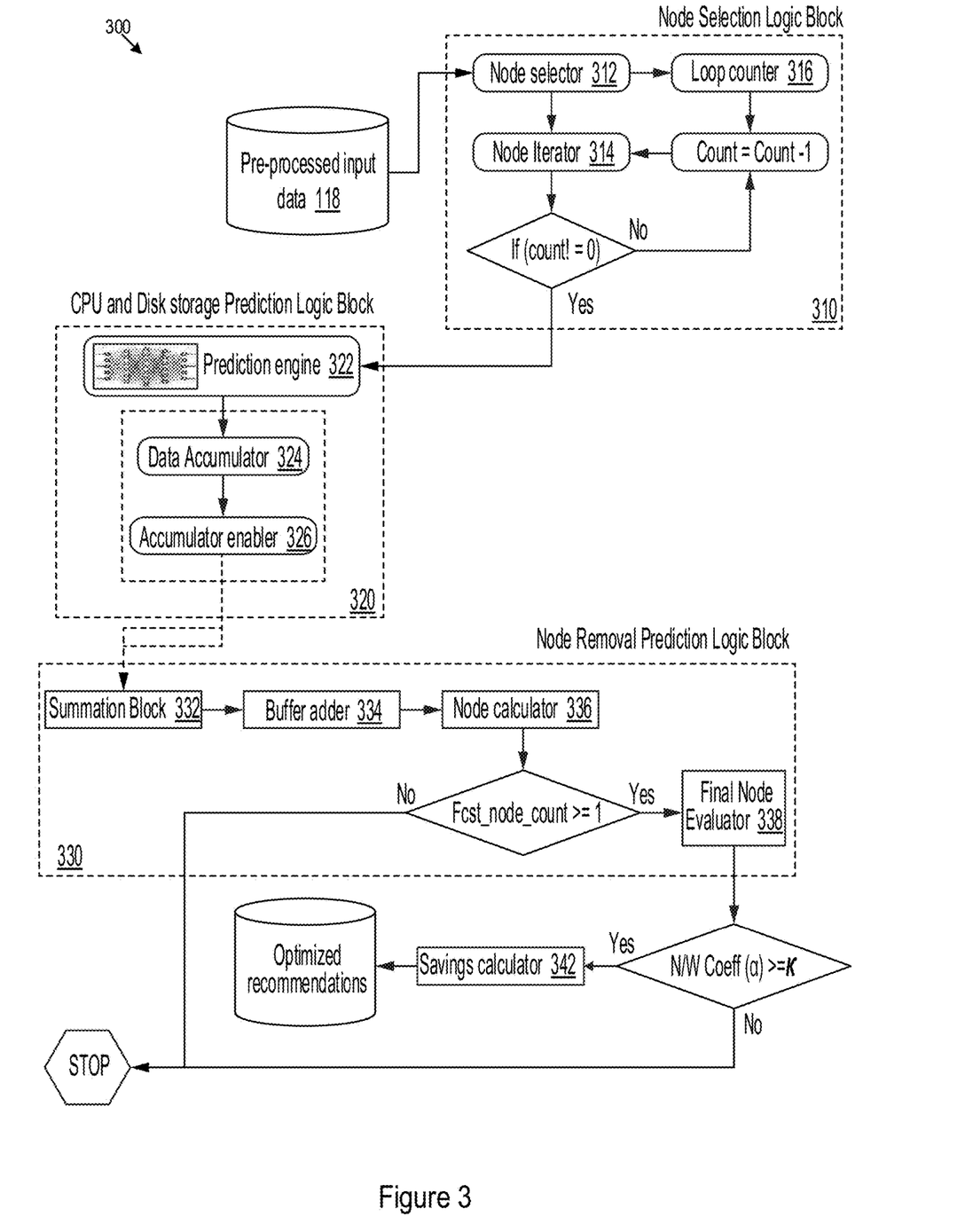
FIG. 3 shows an example specific execution implementation for a prescriptive engine layer of the cluster node optimization stack in accordance with an embodiment.

At the prescriptive engine layer 150, the COL 200 may analyze the nodes of the selected cluster to generate cluster node optimization recommendations. FIG. 3 is an example specific execution implementation 300 for the prescriptive engine layer 150 of the CNO stack 100. The operations of the COL 200 at the prescriptive engine layer 150 will be described with reference to FIG. 3.

The execution environment 300 may include node selection logic block 310, CPU and disk storage prediction logic block 320, and node removal prediction logic block 330. The node selection logic block 310 may include node selector 312, node iterator 314, and loop counter 316. The CPU and disk storage prediction logic block 320 may include prediction engine 322, data accumulator 324, and accumulator enabler 326. The node removal prediction logic block 330 may include summation block 332, buffer adder 334, node calculator 336, and final node evaluator 338.

At the node selection logic block 310, the COL 200 may select target nodes from the cluster based on the pre-processed utilization tracking data 115 and/or pre-processed network traffic data 117 along with the optimization metric thresholds 122 and the CNO interval 121 (211).

Specifically, at the node selector 312, for each node in the cluster, the COL 200 may calculate CPU utilization of the node for the CNO interval based on the pre-processed CPU utilization tracking data 115 and calculate storage utilization of the node for the CNO interval based on the pre-processed storage utilization tracking data 117. Then, the COL 200 may determine the node to be a target node by comparing the calculate CPU utilization to a CPU utilization threshold and comparing the calculate storage utilization to a storage utilization threshold.

For example, if hourly maximum CPU utilization of the node is less than 10% and the hourly maximum storage utilization of the node is less than 50%, the COL 200 may determine the node to be a target node for further optimization analysis.

After processing the node at the node selector 312, the COL 200 may, at the loop counter 316, count the nodes in the cluster that have yet to be processed. If the count value is greater than zero, the COL 200 may iterate the node selection operation at the node iterator 314 to select target nodes until all the nodes of the cluster have been processed.

Alternatively or additionally, the COL 200 may calculate network receiving throughput and network transmitting throughput of a node in the cluster for the CNO interval based on the pre-processed network traffic data 117. Then, the COL 200 may determine the node to be a target node by comparing the network receiving throughput and the network transmitting throughput to a network throughput threshold. For example, the node can be determined to be the target node only when both the network receiving throughput and the network transmitting throughput is less than a predefined network coefficient value.

Alternatively or additionally, the COL 200 may further obtain storage access data for the cluster, for example, at the input layer 110 via the data staging layer 105. The storage access data may include write/read latency data of the individual nodes in the cluster. Then, the COL 200 may calculate a write latency and a read latency of the node for the CNO interval based on the storage access data and determine the node to be a target node by comparing the write latency and the read latency to a latency threshold. For example, the node can be determined to be the target node only when both the write latency and the read latency is less than a predefined latency threshold value, for example, 10 seconds.

Returning to FIG. 3, at the CPU and disk storage prediction logic block 320, the COL 200 may execute a prediction engine to predict storage utilizations over a next operation cycle for the target nodes that are selected at the node selection logic block 310 (212). The prediction engine 322 may include a deep machine learning model trained to predict the storage utilizations for individual target nodes. The deep machine learning model may be recurrent neural networks or feed-forward neural networks (e.g. autoregressive Wavenet).

Specifically, at the prediction engine 322, the COL 200 may predict the storage utilizations over a next operation cycle for each of the target nodes based on its historical storage utilization data and the historical CPU utilization data. Optionally, the COL 200 may perform the prediction only when the number of utilization data records for the target nodes is greater than a predetermined number threshold, which may, for example, be 720.

The COL 200 may output the prediction results for the individual target nodes to the data accumulator 324. At the accumulator enabler 326, the COL 200 may monitor if all of the target nodes have been predicted at the CPU and disk storage prediction logic block 320. When all of the target nodes have been processed, the COL 200 may move to operate at the node removal prediction logic block 330.

At the node removal prediction logic block 330, the COL 200 may generate an aggregated storage utilization prediction for the cluster based on the predicted storage utilizations for individual target nodes (214), determine a network traffic coefficient for the cluster based on the pre-processed network traffic data 117 (216), and perform a cluster determination whether to execute a cluster node optimization for the selected computing resource cluster based on the aggregated storage utilization prediction and the network traffic coefficient (218).

Specifically, at the summation block 332, the COL 200 may sum the predicted storage utilizations for individual target nodes. Then, the COL 200 may determine a buffer percentage based on storage usage ratio of the cluster, i.e., currently used disk storage/provisioned disk storage. As an example, if the storage usage ratio of the cluster is lesser than or equal to a predefined storage usage ratio threshold, a high buffer percentage, for example 20%, may be applied. Otherwise, a low buffer percentage, for example 10%, may be applied.

If the buffer percentage is determined to be 20%, the COL 200 may add an additional 20% storage buffer to the summed storage utilization prediction whose result is the predicted storage usage for the cluster over the next period cycle.

At the final node evaluator 338, the COL 200 may obtain, from the pre-processed network traffic data 117, the maximum network traffic for a given time-period "f", i.e., $\Omega(t)$, and the current network traffic for the given time period "f", i.e., $\delta(t)$, for example, the current week slot's network traffic. Then, the COL 200 may calculate the network traffic coefficient $\alpha$ as $\Omega(t)/\delta(t)$.

The COL 200 may further determine the number of nodes that are needed to accommodate the predicted storage usage for the cluster, for example, based on the storage capacity of the nodes. In this way, the COL 200 may determine the number of nodes that can be detached from the cluster without impacting the performance of the cluster.

When some nodes are removable out of the cluster and the network traffic coefficient is greater than a predetermined coefficient constant, the COL 200 may determine to execute a cluster node optimization for the cluster. The predetermined coefficient constant may be tuned for different applications. For example, the coefficient constant may be tuned be closer to 1 for high traffic applications.

Optionally, the COL 200 may select the nodes to be removed from the target nodes based on the historical storage/CPU utilization of the nodes. For example, the COL 200 may list the target nodes in order of their low-performance-frequency counts, and then select the nodes with the most low-performance-frequency counts as the removable nodes.

Optionally, the execution environment 300 may further include a savings calculator 342, At the savings calculator 342, the COL 200 may generate a consumption optimization preview for the cluster based on the number of the removable nodes and consumption metrics data for the cluster. The COL 200 may obtain the consumption metrics data, for example, at the input layer 110 via data staging layer 105.

For example, the COL 200 may calculate the pre-optimization cost of the cluster and the post-optimization cost of the cluster, and thereby obtaining the potential savings benefiting from the recommended cluster node optimization. Generally, the more the potential savings are, the higher priority that the cluster should be optimized. For example, for each of the clusters undergoing the cluster node optimization analysis, for example, the clusters 0-10 in Table 2, the COL 200 may calculate the potential savings percentage on overall potential savings. Then, the COL 200 may sort the potential savings percentages in ascending order and calculate cumulative saving percentages incrementally for each of the clusters in such ascending order, as shown in Table 2.

As an example, if the cumulative savings percentage for a cluster such as cluster 5 and cluster 8 is greater than or equals to 85%, the optimization priority for the cluster is set to be high. If the cumulative savings percentage for a cluster such as cluster 2 is less than 85% but greater than or equals to 65%, the optimization priority for the cluster is set to be medium. If the cumulative savings percentage for a cluster is less than 65%, the optimization priority for the cluster is set to be low.

TABLE 2

Cumulative savings percentage for clusters

| Cluster ID | Savings($) | Savings % | CumulativeSaving % | Priority |
|---|---|---|---|---|
| cluster 7 | 133 | 3.349282 | 3.349282297 | Low |
| cluster 0 | 212 | 5.338706 | 8.687987912 | Low |
| cluster 6 | 250 | 6.295643 | 14.98363133 | Low |
| cluster 9 | 280 | 7.051121 | 22.03475195 | Low |
| cluster 4 | 290 | 7.302946 | 29.33769831 | Low |
| cluster 3 | 400 | 10.07303 | 39.41072778 | Low |
| cluster 1 | 429 | 10.80332 | 50.21405188 | Low |
| cluster 10 | 437 | 11.00478 | 61.21883657 | Low |
| cluster 2 | 490 | 12.33946 | 73.55829766 | Medium |
| cluster 5 | 500 | 12.59129 | 86.14958449 | High |
| cluster 8 | 550 | 13.85042 | 100 | High |

For purpose of illustration, the COL 200 may execute the example routines in Table 3 to implement functions of the prescriptive engine layer 150 in individual modules of the execution environment 300.

TABLE 3

Example Routine for prescribing duster node optimization
Description

Example Routine    Algorithm formula:

If [$\Psi(t)$ <= $\varkappa$ AND $\lambda(t)$ <= $\rho$ AND ($\alpha(t)$ <= $\chi$ AND $\zeta(t)$ <= $\chi$) OR ($\omega(t)$ <= $\delta$ and $\gamma(t)$ <= $\delta$)] THEN $\Omega$
Predicted total storage per cluster ($\Omega$) = If ( $d$ <= $\pi$, THEN [($\epsilon(t)$+ $\epsilon(t)$* $\varphi$)] ELSE [($\epsilon(t)$+ $\epsilon(t)$* $\sigma$)]
where,
$\Psi(t)$ = CPU Utilization for the past "t" days
$\varkappa$ = User defined CPU utilization threshold value
$\lambda(t)$ = Disk space utilization for the past "t" days
$\rho$ = User defined Disk space utilization threshold value
$\alpha(t)$ = Network receiving throughput for the past "t" days
$\chi$ = User defined network co-efficient value
$\zeta(t)$ = Network transmitting throughput for the past "t" days
$\omega(t)$ = Write latency for the past "t" days
$\gamma(t)$ = Read latency for the past "t" days
$\delta$ = User defined latency threshold value generally 10 seconds
$d$ = Disk usage ratio such that current disk used storage / provisioned disk storage
$\pi$ = User defined disk usage ratio threshold value
$\epsilon(t)$ = Deep learning engine predicted storage value
$\varphi$ = High buffer(20%) to apply
$\sigma$ = Low buffer(10%) to apply
Node Selection Logic Block:
IF HOUR_MAX_CPU_UTIL < 10% and HOUR_MAN_DISK_UTIL < 50% THEN data_selection_flag = 'Y' ELSE data_selection_flag = 'N'
CPU & Disk Storage Prediction Logic Block:
IF Sum_func(count(data_to_process)) > $\rho$, THEN
STORAGE_PREDICTION(NSx) = Wavenet(HISTORICAL_STG_UTILIZATION, HISTORICAL_CPU_UTILIZATION)
Node Removal Prediction Logic Block:
PREDICTED_CLUSTER_STG = NS1 + NS2 + NS3 ... NSn
FCST_TOT_STG = PREDICTED_CLUSTER_STG + B1
IF FCST_NODE_COUNT >= 1 THEN REMOV_NODES = CLUSTER_NODE_COUNT − FCST_NODE_COUNT
IF $\alpha$ >= $\kappa$ THEN TRANSITION_FLAG = 'YES'
Savings Calculator:
CUR_CLUSTER_COST = CLUSTER_NODE_COUNT * COST
OPTIMIZED_ COST = (CLUSTER_NODE_COUNT − REMOV_NODES) * COST
POTENTIAL_SAVINGS = CUR_CLUSTER_COST − OPTIMIZED_COST
Where
  $NS_1$, $NS_2$, $NS_3$...$NS_x$...$NS_n$ = Node wise predicted storage
  PREDICTED_CLUSTER_STG = Sum of predicted nodes' storage
  FCST__TOT_STG = Total predicted cluster storage with buffer
  $\beta1$ = buffer value for predicted cluster storage TABLE 3-continued Example Routine for prescribing duster node optimization
Description Example
Routine  Algorithm formula:

CLUSTER_NODE_COUNT = number of nodes in current cluster
FCST_NODE_COUNT = number of nodes required to handle the
predicted storage from lookup table
REMOV_NODES = removable nodes
CUR_CLUSTER_COST = Total cost per cluster before optimization
OPTIMIZED_COST = Total cost per cluster after optimization
$\alpha$ = Network traffic coefficient which is equal to $\Omega(t)/\delta(t)$
  $\Omega(t)$ = maximum network traffic for the given time-period "t"
  $\delta(t)$ = current network traffic for the given time-period "t"
$\kappa$ = Constant that can be tuned for a given application or environment Optionally, upon determining to execute a cluster node optimization for the cluster, the COL 200 may output its optimization recommendations as a CNO token 152. The prescriptive engine layer 150 may send the CNO token 152 to a host interface for management of the cluster nodes. For example, the host interface may include an Application Programming Interface (API) for removing the identified nodes. The CNO token 152 may be configured to control the API and remove the identified nodes from the cluster as recommended.

Optionally, the COL 200 may execute the similar operations at the prescriptive engine layer 150 to output respective cluster node optimization recommendations for each of the clusters in the cloud data warehouse.

Alternatively, it is likely that the COL 200 may select only a portion of the clusters in the cloud data warehouse to perform cluster node optimization analysis on them. In some implementation, the COL 200 may obtain a utilization time length for a cluster and a utilization data missing coefficient for the cluster, for example, at the input layer 110 via the data-staging layer 105. The utilization time length may be represented by days and the utilization data missing coefficient may represent the percentage of days for which the utilization data is missing over the utilization time length. Then, the COL 200 may select the cluster for cluster node optimization if the utilization time length is greater than or equal to a utilization time length threshold and the utilization data missing coefficient is less than a data missing tolerance threshold.

For example, the utilization time length threshold is 90 days and the data missing tolerance threshold is 10%. If a cluster has 90 days of utilization but only has 83 days of utilization data, i.e., 7 days of utilization data is missing, the utilization data missing coefficient of the cluster is 7.8% (i.e., 7/90). Because the utilization time length of the cluster (90 days) is equal to the utilization time length threshold (90 days) and the utilization data missing coefficient of the cluster (7.8%) is less than the data missing tolerance threshold (10%), the COL 200 may select the cluster for cluster node optimization.

Upon the cluster node optimization recommendations are output, the COL 200 then may, at the prescriptive engine layer 150, store the cluster node optimization recommendations via a memory operation at the data staging layer 105 (219).

Now referring to the presentation layer 160 in FIG. 1, where the COL 200 may access the optimization recommendations from the prescriptive engine layer 150, e.g., via data staging layer 105 memory operations to generate a CNO-control interface 166 including a CNO-window presentation 168 (220).

Figure 4:
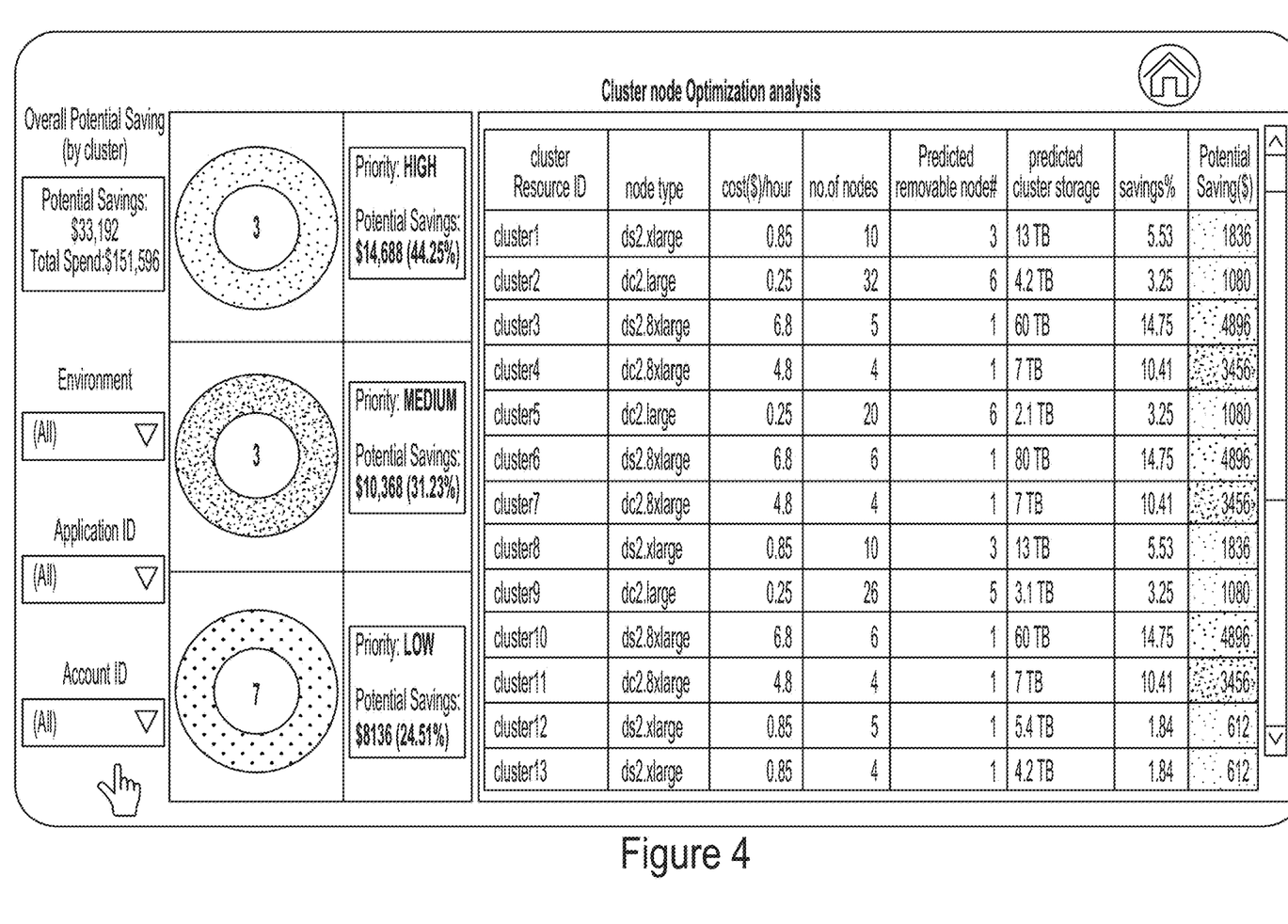
FIG. 4 shows an example cluster node optimization control interface.
Figure 5:
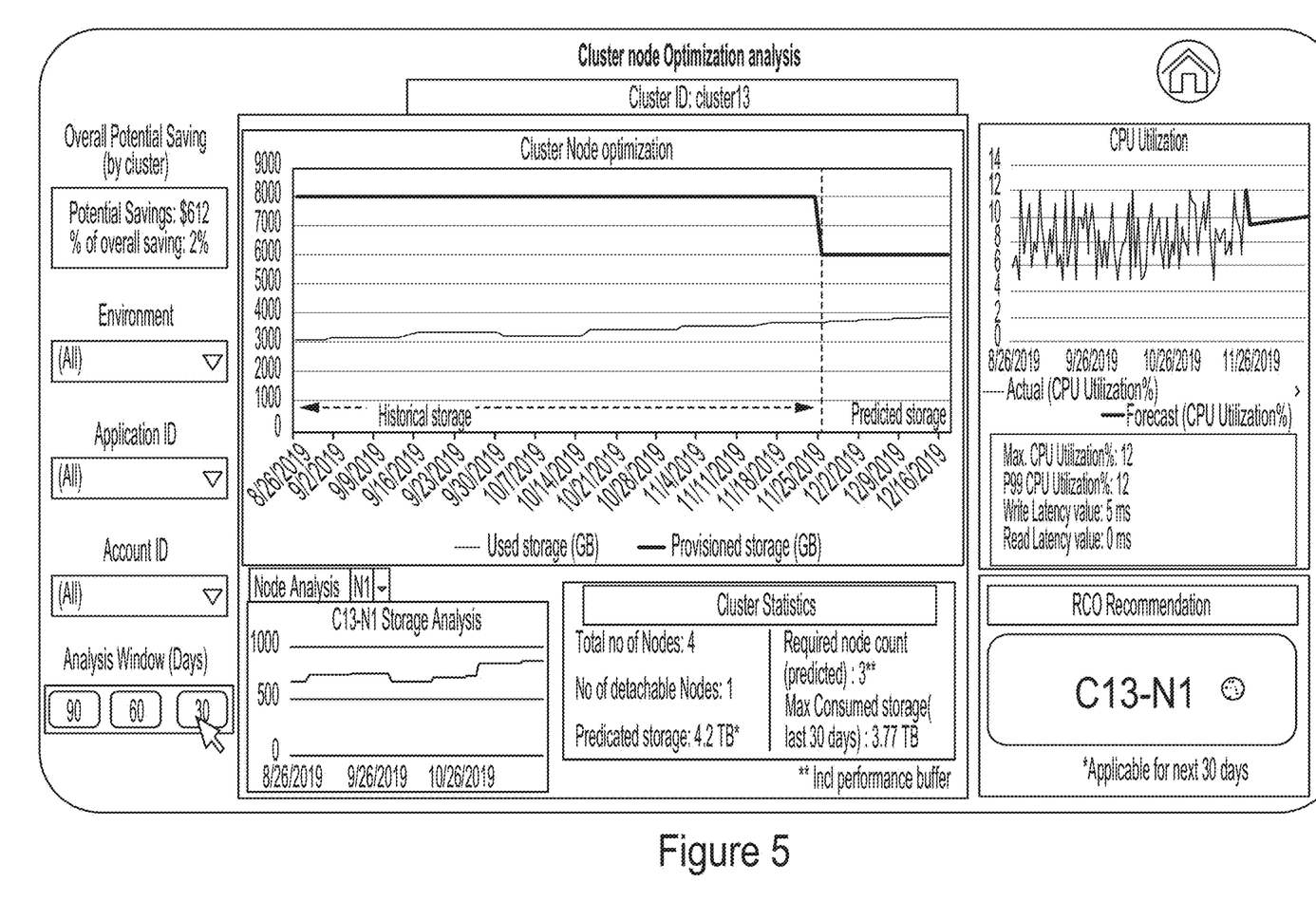
FIG. 5 shows a second example cluster node optimization control interface.

The CNO-window presentation 168 may include data and/or selectable options related to the optimization recommendations. In particular, the CNO-window presentation 168 may be configured to display prescriptive analysis information with regard to the cluster node optimization. In particular, FIG. 4 illustrates an example of the cluster node optimization analysis preview by cluster including, for example, the number of nodes, the predicted cluster storage, the predicted detachable nodes, and potential savings. It may also illustrate the cluster node optimization priority for the clusters in accordance with their potential savings. FIG. 5 illustrates an example of a detailed cluster node optimization analysis for a specific cluster including, for example, the historical storage and predicted storage preview for the cluster, the historical CPU utilization preview, and the optimization recommendations for this cluster.

Further, an option to forward a CNO token, to a host interface for cluster node removal in accord the recommendations may be included as one of the selectable options available through the CNO-window presentation 168.

Figure 6:
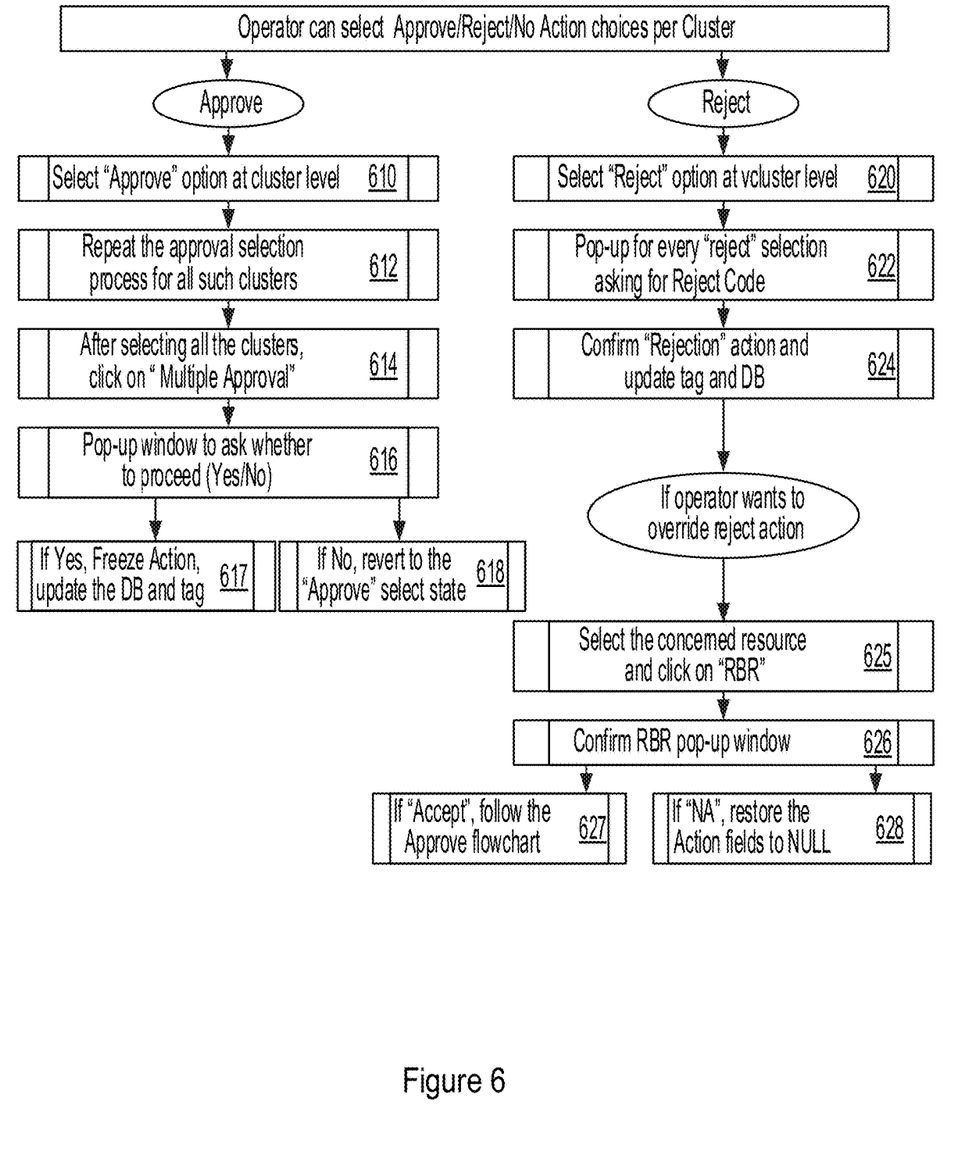
FIG. 6 shows an example interaction logic with a cluster node optimization control interface in accordance with an embodiment.

Additionally or alternatively, the CNO-window presentation may include an option to approve/reject one or more (or all of) the cluster node optimization recommendations. FIG. 6 shows an example interaction logic between the operator and the CNO-window presentation 168 to approve/reject the displayed optimization recommendations. Specifically, the operator may take approval/rejection action per cluster in the CNO-window presentation 168.

For example, the CNO-window presentation 168 may include "Approve," "Reject," and "No action" options for each of the clusters. The operator may select "Approve" option at cluster level (610) and repeat the "Approve" selection for other clusters (612). After finishing the option selections for all the clusters, the operator may click on "Multiple Approval" option (614). As response, the CNO-window presentation 168 may pop-up a window to ask the operator to confirm to proceed with "Yes" and/or "No" options (616). If the operator selects "Yes" option, the CNO-window presentation 168 may freeze action in the window and update the operators inputs in the background (617). If the operator selects "No" option, the CNO-window presentation 168 may revert to the "Approve" selection state (618).

The operator may also select "Reject" option at cluster level (620). For each "Reject" selection, the CNO-window presentation 168 may pop up a window to ask for a rejection code justifying the rejection (622). Where the rejection code is verified, the CNO-window presentation 168 may confirm the rejection action and update the operator's inputs in the background (624).

Optionally, if the operator would like to override his/her previous rejection action, the operator may select the concerned clusters and click "RBR" option (625). As response, the CNO-window presentation 168 may pop up a window to confirm the "RBR" selection with "Accept" and "NA" options (626). If the operator selects "Accept" option, the CNO-window presentation 168 may enable to select the "Approve" option for the concerned clusters (627). If the operator selects "NA", the CNO-window presentation 168 may nullify all the selection actions with respect to the concerned clusters (628).

Additionally or alternatively, the CNO-window presentation 168 may include options for the operator to input the ONO interval and various optimization metric thresholds.

After analysis and presentation of the CNO-control interface, the prescriptive engine layer 150 may generate a ONO token 152 based on the operator input and the optimization recommendations (224).

Figure 7:
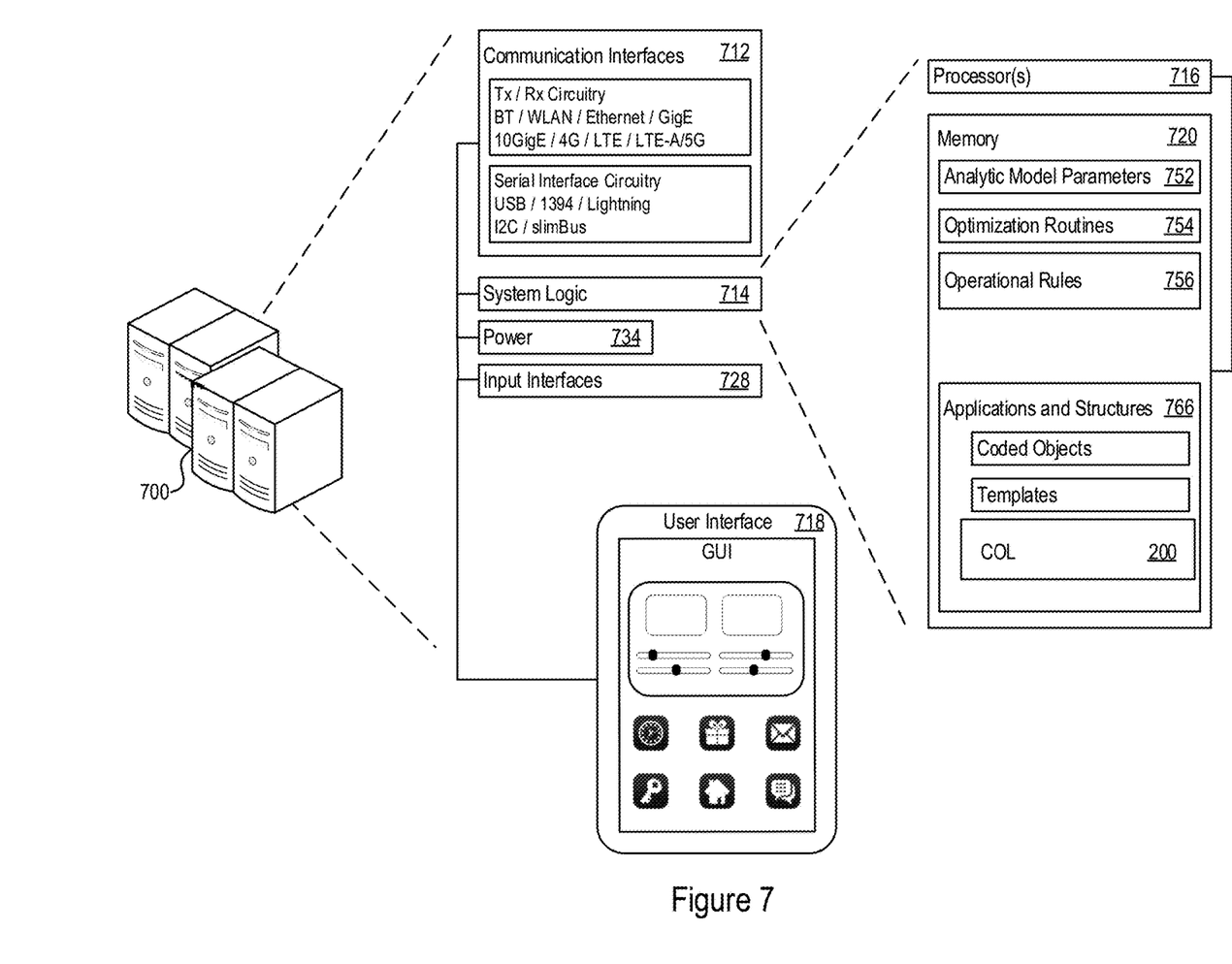
FIG. 7 shows an example specific execution environment for the cluster node optimization stack.

After generation of the CNO token 152, the COL 200 may initiate deployment of the CNO token 152 by causing network interface circuitry (e.g., the communication interfaces 712) to send the CNO token 152 to a host interface for cluster node optimization (226). For example, services such as Amazon® VVeb Services (AWS), Cloudian®, Microsoft® Azure, or other cloud computing services, may maintain host interfaces (e.g., web interfaces, application programming interfaces, or other interfaces) by which cloud user may manage cluster nodes.

In some cases, the COL 200 may initiate deployment via the data export layer 170. The data export layer 170 may format the reservation matrix in one or more formats for transfer. For example, the data export layer 170 may support format translation to Java script object notation (JSON), extensible markup language (XML), comma separated value (CSV), Tableau Workbook (TBWX), hypertext markup language (HTML) or other formats. The data export layer 170 may also support transfer of the CNO token in one or more states, such as flat file transfers, streaming transfers, web service access, Internet protocol transfers, or other transfers.

Additionally or alternatively, the COL 200 may initiate deployment via the prescriptive engine layer 150 through direct transfer, direct network access, or other non-export transfer.

FIG. 7 shows an example specific execution environment 700 for the CNO stack 100 described above. The execution environment 700 may include system logic 714 to support execution of the multiple layers of CNO stack 100 described above. The system logic may include processors 716, memory 720, and/or other circuitry.

The memory 720 may include analytic model parameters 752, optimization routines 754, and operational rules 756. The memory 720 may further include applications and structures 766, for example, coded objects, machine instructions, templates, or other structures to support pre-processing the utilization tracking data and network traffic data, predicting storage utilizations, or other tasks described above. The applications and structures may implement the COL 200.

The execution environment 700 may also include communication interfaces 712, which may support wireless, e.g. Bluetooth, Wi-Fi, WLAN, cellular (4G, LTE/A, 5G), and/or wired, Ethernet, Gigabit Ethernet, optical networking protocols. The communication interfaces 712 may also include serial interfaces, such as universal serial bus (USB), serial ATA, IEEE 1394, lighting port, I²C, slimBus, or other serial interfaces. The communication interfaces 712 may be used to support and/or implement remote operation of the CNO-control interface 166. The execution environment 700 may include power functions 734 and various input interfaces 728. The execution environment may also include a user interface 718 that may include human-to-machine interface devices and/or graphical user interfaces (GUI). The user interface 718 may be used to support and/or implement local operation of the CNO-control interface 166. In various implementations, the system logic 714 may be distributed over one or more physical servers, be implemented as one or more virtual machines, be implemented in container environments such as Cloud Foundry or Docker, and/or be implemented in Serverless (functions as-a-Service) environments.

In some cases, the execution environment 700 may be a specially defined computational system deployed in a cloud platform. In some cases, the parameters defining the execution environment may be specified in a manifest for cloud deployment. The manifest may be used by an operator to requisition cloud based hardware resources, and then deploy the software components, for example, the CNO stack 100, of the execution environment onto the hardware resources. In some cases, a manifest may be stored as a preference file such as a YAML (yet another mark-up language), JSON, or other preference file type. Additionally or alternatively, the manifest may include custom scripts to implement the CNO stack 100 in a serverless environment, for example, using the multiple-tier multiple-node serverless framework described in U.S. patent application Ser. No. 16/159,399, filed 12 Oct. 2018, and entitled Distributed Multiple Tier Multi-Node Serverless Framework for Complex Analytics Task Execution, which is incorporated by reference herein in its entirety. Therein, a multiple-tier framework is described. The framework describes a series of the serverless tasks controlled via scripts. The serverless tasks overlap in execution to maintain continuity across the tasks. The computational task in divided into chunks that may be handled by individual serverless tasks. Accordingly, a complex analytic process, such as those describe in this disclosure, may be divided into chunks and executed over one or more overlapping serverless tasks.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g.; database records); objects; and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations as described below may use the techniques and architectures described above.

A1 In an example, a system comprises: network interface circuitry configured to: receive utilization tracking data for a selected computing resource cluster of computing resource nodes; receive network traffic data for the selected computing resource cluster; and send a cluster node optimization (CNO) token to a host interface, the host interface configured to control cluster node optimization for at least the selected computing resource cluster; optimization circuitry in data communication with the network interface circuitry, the optimization circuitry configured to execute a cluster node optimization (ONO) stack, the CNO stack executable to: at an input layer of the CNO stack: obtain, via the network interface circuitry, the utilization tracking data and the network traffic data; and store the utilization tracking data and the network traffic data via a storage operation at a data-staging layer of the ONO stack; at a configuration layer of the ONO stack: determine a CNO interval; and determine optimization metric thresholds; at a prescriptive engine layer of the ONO stack: select target computing resource nodes from the selected computing resource cluster based on the utilization tracking data, the optimization metric thresholds, and the ONO interval; execute a prediction engine to predict respective storage utilizations over a next operation cycle for the target computing resource nodes; generate aggregated storage utilization prediction for the selected computing resource cluster based on the predicted storage utilizations; determine a network traffic coefficient for the selected computing resource cluster based on the network traffic data; perform a cluster determination whether to execute a cluster node optimization for the selected computing resource cluster based on the aggregated storage utilization prediction and the network traffic coefficient; and generate the CNO token based on the cluster determination.

A2 The system of example A1, where the ONO stack is further executable to, at a presentation layer of the ONO stack, generate a ONO control interface including a CNO-window presentation; and the CNO-window presentation includes a selectable option to execute a cluster node optimization.

A3 The system of example A2, where the CNO-window presentation further includes a selectable option to reject execution of the cluster node optimization.

A4 The system of either of examples A2 or A3, where the CNO-window presentation is configured to display multiple cluster node optimizations each for a corresponding computing resource cluster.

A5 The system of any of examples A2-A4, where the CNO-window presentation further includes a ONO interval selection control configured to receive a selection of the CNO interval from an entry in the ONO window presentation by an operator.

A6 The system of any of examples A1-A5, where the optimization circuitry is further configured to pre-process the utilization tracking data and the network traffic data by data transformation comprising z transformation or log transformation and data treatment on outlier data, anomaly data, or missing value data.

A7 The system of any of examples A1-A6, where the utilization tracking data includes processor utilization tracking data and storage utilization tracking data, the optimization circuitry is configured to select the target computing resource nodes from the selected computing resource cluster by: calculating processor utilization of a computing resource node in the selected computing resource cluster for the ONO interval based on the processor utilization tracking data; calculating storage utilization of the computing resource node for the ONO interval based on the storage utilization tracking data; and identifying the computing resource node as one of the target computing resource nodes by comparing the processor utilization to a processor utilization threshold and comparing the storage utilization to a storage utilization threshold.

A8 The system of any of examples A1-A7, where the optimization circuitry is configured to select the target computing resource nodes from the selected computing resource cluster by: calculating network receiving throughput and network transmitting throughput of a computing resource node in the selected computing resource cluster for the ONO interval based on the network traffic data; and identifying the computing resource node as one of target computing resource nodes by comparing the network receiving throughput and the network transmitting throughput to a throughput threshold.

A9 The system of any of examples A1-A8, where the optimization circuitry is further configured to: obtain, at the input layer, storage access data for the selected computing resource cluster; and select the target computing resource nodes from the selected computing resource cluster by: calculating a write latency and a read latency of a computing resource node in the selected computing resource cluster for the ONO interval based on the storage access data; and identifying the computing resource node as one of the target computing resource nodes by comparing the write latency and the read latency to a latency threshold.

A10 The system of any of examples A1-A9, where the optimization circuitry is configured to generate the aggregated storage utilization prediction for the selected computing resource cluster based on the predicted storage utilizations by: determining a buffer percentage of a storage buffer based on a storage usage ratio of the selected computing resource cluster; and summing the predicted storage utilizations with the buffer percentage to generate the aggregated storage utilization prediction.

A11 The system of any of examples A1-A10, where the prediction engine includes a feed forward neural network model trained to predict storage utilization of target computing resource nodes.

A12 The system of any of examples A1-A11, where the optimization circuitry is configured to perform the cluster determination by comparison of the network traffic coefficient to a traffic threshold.

A13 The system of any of examples A1-A12, where the optimization circuitry is configured to perform the cluster determination by calculating a number of computing resource nodes removable from the selected computing resource cluster based on the aggregated storage utilization prediction.

A14 The system of example A13, where the optimization circuitry is further configured to select the number of computing resource nodes removable from the selected computing resource cluster based on performance data of the target computing resource nodes in the selected computing resource cluster.

A15 The system of example A13 or A14, where the optimization circuitry is further configured to generate a consumption optimization preview for the selected computing resource cluster based on the number of the removable computing resource nodes removable from the selected computing resource cluster and consumption metrics data for the selected computing resource cluster.

A16 The system of example A15, where the optimization circuitry is further configured to determine a priority to execute the cluster node optimization for the selected computing resource cluster based on the consumption optimization preview.

A17 The system of any of examples A1-A16, the optimization circuitry is further configured to: select the selected computing resource cluster from a plurality of computing resource clusters by: obtaining a utilization time length for a computing resource cluster; obtaining a utilization data missing coefficient for the computing resource cluster; and determining the computing resource cluster as the selected computing resource cluster by comparison of the utilization time length to a utilization time length threshold and comparison of the utilization data missing coefficient to a data missing tolerance threshold.

A18 The system of example A17, where the utilization time length threshold is a predetermined number of days and the data missing tolerance threshold is a predetermined percentage of days for which utilization tracking data is missing.

B1 In an example, a method comprising: at network interface circuitry: receiving utilization tracking data for a selected computing resource cluster of computing resource nodes; and receiving network traffic data for the selected computing resource cluster; at optimization circuitry in data communication with the network interface circuitry, the optimization circuitry executing a cluster node optimization (CNO) stack: obtaining, at an input layer of the ONO stack, the utilization tracking data and the network traffic data via the network interface circuitry; storing, at the input layer, the utilization tracking data and the network traffic data via a storage operation at a data-staging layer of the ONO stack; determining, at a configuration layer of the ONO stack, a ONO interval; determining, at the configuration layer, optimization metric thresholds; selecting; at a prescriptive engine layer of the ONO stack, target computing resource nodes from the selected computing resource cluster based on the utilization tracking data, the optimization metric thresholds, and the ONO interval; predicting, at the prescriptive engine layer, with a prediction engine; respective storage utilizations over a next operation cycle for the target computing resource nodes; generating, at the prescriptive engine layer, an aggregated storage utilization prediction for the selected computing resource cluster based on the predicted storage utilizations; calculating, at the prescriptive engine layer, a network traffic coefficient for the selected computing resource cluster based on the network traffic data; determining, at the prescriptive engine layer, to execute a cluster node optimization for the selected computing resource cluster based on the aggregated storage utilization prediction and the network traffic coefficient; and generating; at the prescriptive engine layer, a ONO token based on the determination; and sending, via the network interface circuitry, the ONO token to a host interface configured to control cluster node optimization for at least the selected computing resource cluster.

C1 In an example, a product including: machine-readable media other than a transitory signal; and instructions stored on the machine-readable media; the instructions configured to, when executed, cause a machine to: at network interface circuitry: receive utilization tracking data for a selected computing resource cluster of computing resource nodes; and receive network traffic data for the selected computing resource cluster; at optimization circuitry in data communication with the network interface circuitry; the optimization circuitry executing a cluster node optimization (CNO) stack: obtain, at an input layer of the ONO stack, the utilization tracking data and the network traffic data via the network interface circuitry; store, at the input layer, the utilization tracking data and the network traffic data via a storage operation at a data-staging layer of the ONO stack; determine, at a configuration layer of the ONO stack, a ONO interval; determine, at the configuration layer, optimization metric thresholds; select, at a prescriptive engine layer of the CNO stack, target computing resource nodes from the selected computing resource cluster based on the utilization tracking data, the optimization metric thresholds, and the ONO interval; predict, at the prescriptive engine layer, with a prediction engine; respective storage utilizations over a next operation cycle for the target computing resource nodes; generate, at the prescriptive engine layer, an aggregated storage utilization prediction for the selected computing resource cluster based on the predicted storage utilizations; calculate, at the prescriptive engine layer, a network traffic coefficient for the selected computing resource cluster based on the network traffic data; determine, at the prescriptive engine layer, to execute a cluster node optimization for the selected computing resource cluster based on the aggregated storage utilization prediction and the network traffic coefficient; and generate, at the prescriptive engine layer, a CNO token based on the determination to execute the cluster node optimization; and send; with network interface circuitry, the CNO token to a host interface configured to control cluster node optimization for at least the selected computing resource cluster.

D1 A method implemented by operation of a system of any of examples A1-A18.

E1 A product comprising instructions stored on a machine readable medium, the instructions configured to cause a machine to implement the method of example D1.

Various implementations have been specifically described. However, many other implementations are also possible.

What is claimed is:

1. A system comprising:
network interface circuitry configured to:
receive utilization tracking data for a selected computing resource cluster of computing resource nodes;
receive network traffic data for the selected computing resource cluster; and
send a cluster node optimization (CNO) token to a host interface, the host interface configured to control cluster node optimization for at least the selected computing resource cluster;
optimization circuitry in data communication with the network interface circuitry, the optimization circuitry configured to execute a cluster node optimization (CNO) stack, the CNO stack executable to:
at an input layer of the CNO stack:
obtain, via the network interface circuitry, the utilization tracking data and the network traffic data; and
store the utilization tracking data and the network traffic data via a storage operation at a data-staging layer of the ONO stack;
at a configuration layer of the ONO stack:
determine a ONO interval; and
determine optimization metric thresholds;
at a prescriptive engine layer of the ONO stack:
select target computing resource nodes from the selected computing resource cluster based on the utilization tracking data; the optimization metric thresholds, and the CNO interval;
execute a prediction engine to predict respective storage utilizations over a next operation cycle for the target computing resource nodes;
generate an aggregated storage utilization prediction for the selected computing resource cluster based on the predicted storage utilizations;
determine a network traffic coefficient for the selected computing resource cluster based on the network traffic data;
perform a cluster determination to execute a cluster node optimization for the selected computing resource cluster based on the aggregated storage utilization prediction and the network traffic coefficient; and
generate the CNO token based on the cluster determination.

2. The system of claim 1, where:
the CNO stack is further executable to, at a presentation layer of the CNO stack, generate a CNO control interface including a CNO-window presentation; and
the CNO-window presentation includes a selectable option to execute a cluster node optimization.

3. The system of claim 2, where the CNO-window presentation further includes a selectable option to reject execution of the cluster node optimization.

4. The system of claim 2, where the CNO-window presentation is configured to display multiple cluster node optimizations each for a corresponding computing resource cluster.

5. The system of claim 2, where the CNO-window presentation further includes a CNO interval selection control configured to receive a selection of the CNO interval from an entry in the CNO window presentation by an operator.

6. The system of claim 1, where the optimization circuitry is further configured to pre-process the utilization tracking data and the network traffic data by data transformation comprising z transformation or log transformation and data treatment on outlier data, anomaly data, or missing value data.

7. The system of claim 1, where the utilization tracking data includes processor utilization tracking data and storage utilization tracking data, and the optimization circuitry is configured to select the target computing resource nodes from the selected computing resource cluster by:
calculating processor utilization of a computing resource node in the selected computing resource cluster for the CNO interval based on the processor utilization tracking data;
calculating storage utilization of the computing resource node for the CNO interval based on the storage utilization tracking data; and
identifying the computing resource node as one of the target computing resource nodes by comparing the processor utilization to a processor utilization threshold and comparing the storage utilization to a storage utilization threshold.

8. The system of claim 1, where the optimization circuitry is configured to select the target computing resource nodes from the selected computing resource cluster by:
calculating network receiving throughput and network transmitting throughput of a computing resource node in the selected computing resource cluster for the CNO interval based on the network traffic data; and
identifying the computing resource node as one of the target computing resource nodes by comparing the network receiving throughput and the network transmitting throughput to a throughput threshold.

9. The system of claim 1, where the optimization circuitry is further configured to:
obtain, at the input layer, storage access data for the selected computing resource cluster; and
select the target computing resource nodes from the selected computing resource cluster by:
calculating a write latency and a read latency of a computing resource node in the selected computing resource cluster for the CNO interval based on the storage access data; and
identifying the computing resource node to be one of the target computing resource nodes by comparing the write latency and the read latency to a latency threshold.

10. The system of claim 1, where the optimization circuitry is configured to generate the aggregated storage utilization prediction for the selected computing resource cluster based on the predicted storage utilizations by:
determining a buffer percentage of a storage buffer based on a storage usage ratio of the selected computing resource cluster; and
summing the predicted storage utilizations with the buffer percentage to generate the aggregated storage utilization prediction.

11. The system of claim 1, where the prediction engine includes a feed forward neural network model trained to predict storage utilization of target computing resource nodes.

12. The system of claim 1, where the optimization circuitry is configured to perform the cluster determination by comparison of the network traffic coefficient to a traffic threshold.

13. The system of claim 1, where the optimization circuitry is configured to perform the cluster determination by calculating a number of computing resource nodes removable from the selected computing resource cluster based on the aggregated storage utilization prediction.

14. The system of claim 13, where the optimization circuitry is further configured to select the number of computing resource nodes removable from the selected computing resource cluster based on performance data of the target computing resource nodes in the selected computing resource cluster.

15. The system of claim 13, where the optimization circuitry is further configured to generate a consumption optimization preview for the selected computing resource cluster based on the number of computing resource nodes removable from the selected computing resource cluster and consumption metrics data for the selected computing resource cluster.

16. The system of claim 15, where the optimization circuitry is further configured to determine a priority to execute the cluster node optimization for the selected computing resource cluster based on the consumption optimization preview.

17. The system of claim 1, where the optimization circuitry is further configured to:
 select the selected computing resource cluster from a plurality of computing resource clusters by:
  obtaining a utilization time length for a computing resource cluster;
  obtaining a utilization data missing coefficient for the computing resource cluster; and
  determining the computing resource cluster as the selected computing resource cluster by comparison of the utilization time length to a utilization time length threshold and comparison of the utilization data missing coefficient to a data missing tolerance threshold.

18. The system of claim 17, where the utilization time length threshold is a predetermined number of days and the data missing tolerance threshold is a predetermined percentage of days for which utilization tracking data is missing.

19. A method comprising:
 at network interface circuitry:
  receiving utilization tracking data for a selected computing resource cluster of computing resource nodes; and
  receiving network traffic data for the selected computing resource cluster;
 at optimization circuitry in data communication with the network interface circuitry, the optimization circuitry executing a cluster node optimization (CNO) stack by:
  obtaining, at an input layer of the ONO stack, the utilization tracking data and the network traffic data via the network interface circuitry;
  storing, at the input layer, the utilization tracking data and the network traffic data via a storage operation at a data-staging layer of the ONO stack;
  determining, at a configuration layer of the ONO stack, a ONO interval;
  determining, at the configuration layer, optimization metric thresholds;
  selecting, at a prescriptive engine layer of the CNO stack, target computing resource nodes from the selected computing resource cluster based on the utilization tracking data; the optimization metric thresholds, and the CNO interval;
  predicting, at the prescriptive engine layer, with a prediction engine, respective storage utilizations over a next operation cycle for the target computing resource nodes;
  generating, at the prescriptive engine layer, an aggregated storage utilization prediction for the selected computing resource cluster based on the predicted storage utilizations;
  calculating, at the prescriptive engine layer; a network traffic coefficient for the selected computing resource cluster based on the network traffic data;
  determining, at the prescriptive engine layer, to execute a cluster node optimization for the selected computing resource cluster based on the aggregated storage utilization prediction and the network traffic coefficient; and
  generating, at the prescriptive engine layer, a CNO token based on the determination to execute the cluster node optimization; and
 sending, via the network interface circuitry, the CNO token to a host interface configured to control cluster node optimization for at least the selected computing resource cluster.

20. A product including:
 machine-readable media other than a transitory signal; and
 instructions stored on the machine-readable media, the instructions configured to, when executed, cause a machine to:
  at network interface circuitry:
   receive utilization tracking data for a selected computing resource cluster of computing resource nodes; and
   receive network traffic data for the selected computing resource cluster;
  at optimization circuitry in data communication with the network interface circuitry; the optimization circuitry executing a cluster node optimization (CNO) stack:
   obtain, at an input layer of the ONO stack, the utilization tracking data and the network traffic data via the network interface circuitry;
   store, at the input layer, the utilization tracking data and the network traffic data via a storage operation at a data-staging layer of the ONO stack;
   determine, at a configuration layer of the ONO stack, a ONO interval;
   determine, at the configuration layer, optimization metric thresholds;
   select; at a prescriptive engine layer of the ONO stack, target computing resource nodes from the selected computing resource cluster based on the utilization tracking data, the optimization metric thresholds; and the ONO interval;
   predict, at the prescriptive engine layer, with a prediction engine, respective storage utilizations over a next operation cycle for the target computing resource nodes;
   generate, at the prescriptive engine layer, an aggregated storage utilization prediction for the selected computing resource cluster based on the predicted storage utilizations;
   calculate, at the prescriptive engine layer, a network traffic coefficient for the selected computing resource cluster based on the network traffic data;
   determine, at the prescriptive engine layer, to execute a cluster node optimization for the selected computing resource cluster based on the aggregated storage utilization prediction and the network traffic coefficient; and generate, at the prescriptive engine layer, a ONO token based on the determination to execute the cluster node optimization; and
send, with network interface circuitry, the ONO token to a host interface configured to control cluster node optimization for at least the selected computing resource cluster.

\* \* \* \* \*